(12) United States Patent
Manabe et al.

(10) Patent No.: US 8,889,309 B2
(45) Date of Patent: Nov. 18, 2014

(54) FUEL CELL SYSTEM AND AC IMPEDANCE MEASUREMENT METHOD

(75) Inventors: Kota Manabe, Toyota (JP); Masahiro Shige, Kaizuka (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1781 days.

(21) Appl. No.: 11/922,897

(22) PCT Filed: Jul. 4, 2006

(86) PCT No.: PCT/JP2006/313635
§ 371 (c)(1),
(2), (4) Date: Dec. 26, 2007

(87) PCT Pub. No.: WO2007/004732
PCT Pub. Date: Jan. 11, 2007

(65) Prior Publication Data
US 2009/0226770 A1 Sep. 10, 2009

(30) Foreign Application Priority Data
Jul. 5, 2005 (JP) .................................. 2005-195888

(51) Int. Cl.
*H01M 8/04* (2006.01)
(52) U.S. Cl.
CPC ...... *H01M 8/04947* (2013.01); *H01M 8/04597* (2013.01); *Y02E 60/50* (2013.01); *Y02T 90/32* (2013.01); *H01M 8/04626* (2013.01); *H01M 8/0494* (2013.01); *H01M 8/04567* (2013.01); *H01M 8/04656* (2013.01); *H01M 2250/20* (2013.01)
USPC .......................................... 429/431; 429/428
(58) Field of Classification Search
USPC ........... 320/134; 700/293; 429/431, 430, 428, 429/400, 408
See application file for complete search history.

(56) References Cited

U.S. PATENT DOCUMENTS

| 2003/0141188 A1 | 7/2003 | Imamura et al. |
| 2004/0091759 A1 | 5/2004 | Harrington et al. |
| 2005/0112426 A1* | 5/2005 | Toth et al. ................. 429/22 |
| 2007/0259256 A1* | 11/2007 | Le Canut et al. .......... 429/90 |
| 2009/0092861 A1* | 4/2009 | Aleyraz et al. ............. 429/8 |

FOREIGN PATENT DOCUMENTS

| JP | 5-47396 A | 2/1993 |
| JP | 05-047396 A | 2/1993 |
| JP | 8-22834 A | 1/1996 |
| JP | 2002-367650 A | 12/2002 |
| JP | 2003-86220 A | 3/2003 |
| JP | 2003-297408 A | 10/2003 |
| JP | 2003-317775 A | 11/2003 |
| JP | 2003-331930 A | 11/2003 |
| JP | 2004-192942 A | 7/2004 |
| JP | 2005-100864 A | 4/2005 |

* cited by examiner

*Primary Examiner* — Mark F Huff
*Assistant Examiner* — Monique Wills
(74) *Attorney, Agent, or Firm* — Kenyon & Kenyon LLP

(57) ABSTRACT

A fuel cell system capable of measuring AC impedance comprises: power generation stabilizing means for stabilizing power generation in a fuel cell, and impedance measuring means for measuring the AC impedance after power generation in the fuel cell has been stabilized. Since the AC impedance in a low frequency range is measured after power generation in the fuel cell is stabilized, no external disturbance occurs during measurement, and the AC impedance can be measured with a high degree of precision. Thus, a fuel cell system and a measuring method with which AC impedance can be measured with a high degree of precision can be provided.

12 Claims, 4 Drawing Sheets

FUEL CELL SYSTEM AND AC IMPEDANCE MEASUREMENT METHOD

This is a 371 national phase application of PCT/JP2006/313635 filed 4 Jul. 2006, which claims priority of Japanese Patent Application No. 2005-195888 filed 5 Jul. 2005, the contents of which are incorporated herein by reference.

BACKGROUND

The present invention relates to a fuel cell system, and more particularly to an improvement in a technique for measuring AC impedance to detect an operating condition of a fuel cell.

It is known that the output of a fuel cell is affected by the internal condition of the fuel cell, for example the wetness of an electrolyte. The wetness of the electrolyte is commensurate with the complex impedance of the fuel cell, and therefore it has been proposed in the related art to monitor the operating condition of a fuel cell by applying an AC signal to the output of the fuel cell to detect both an amplitude ratio and a phase deviation between a current and a voltage and thereby calculate the complex impedance.

For example, Japanese Unexamined Patent Application Publication 2003-86220 describes a fuel cell system in which the complex impedance of a fuel cell is determined by applying a sine wave signal to an output signal of the fuel cell while varying the frequency from a high frequency to a low frequency, and the moisture condition of the fuel cell is estimated from a resistance component R1 that increases when the internal moisture content of the fuel cell is deficient and a resistance component R2 that increases when the internal moisture content is excessive. The resistance component R1 is measured by applying a high frequency sine wave signal, and the resistance component R2 is measured by applying a low frequency sine wave signal. Japanese Unexamined Patent Application Publication 2003-297408 describes a fuel cell system employing a similar technique, in which the water content of a measured gas is detected from either the voltage or the current of an electrochemical cell.

According to the conventional techniques described above, the internal moisture condition of a fuel cell can be learned indirectly by measuring the impedance of the fuel cell.

SUMMARY

However, in the conventional techniques described above, the measurement precision tends to deteriorate when a low frequency sine wave signal is applied. The reason for this is that auxiliary equipment such as a pump and a compressor serve as the load of the fuel cell, and therefore the output current of the fuel cell varies according to the operating condition of the auxiliary equipment. In other words, it is believed that the load condition varies in accordance with operations of the auxiliary equipment, leading to variation in the output current of the fuel cell. The current is an element for determining the AC impedance, and hence if the current varies periodically in accordance with the load condition, the measured AC impedance takes an inaccurate value.

An object of the present invention is to solve the problems described above by providing a fuel cell system and a measuring method, with which AC impedance can be measured with a high degree of precision.

To achieve this object, the present invention is a fuel cell system capable of measuring AC impedance in a fuel cell, comprising: power generation stabilizing means for keeping power generation in the fuel cell in a stable condition; and impedance measuring means for measuring the AC impedance when power generation in the fuel cell is detected to be [in a stable condition].

The present invention is also an AC impedance measuring method, comprising the steps of: keeping power generation in a fuel cell in a stable condition; and measuring the AC impedance after stabilizing power generation in the fuel cell.

According to the present invention, processing to stabilize power generation in the fuel cell is executed before measuring the AC impedance, and therefore a cause of variation in the power generation of the fuel cell is eliminated during AC impedance measurement. Hence, the AC impedance measured in this condition corresponds to the moisture condition of the fuel cell, and indicates accurate complex impedance.

Here, the "AC impedance" is measured in a low frequency range, for example. A "low frequency range" is a relatively low frequency range within the range in which AC impedance can be measured, and includes frequency $\omega=0$. The AC impedance in this frequency range is capable of varying in accordance with the power generation condition of the fuel cell.

A "stable power generation condition" indicates a condition in which the generated power (power, current, voltage) of the fuel cell takes a constant value, and also a condition in which variation in the generated power is suppressed to or below a predetermined generated power region (range).

Further, the power generation stabilizing means preferably maintain a power generation current of the fuel cell at a constant level.

Here, "a constant level" indicates a fixed current value, and also indicates that current variation is suppressed to or below a predetermined current region (range).

In the present invention, the power generation stabilizing means may be constituted by a storage device electrically connected to the fuel cell; and power controlling means for controlling power transfer between the fuel cell and the storage device such that an output of the fuel cell is stabilized. When power generation in the fuel cell is stabilized, a fixed amount of power is output, but when the required load power is smaller than the output power, a power surplus is generated. According to the constitution described above, surplus power is charged to the storage device, and therefore energy is used effectively. Note that a power surplus occurs when the consumed power (load power) of the load device (for example, a drive motor or the like) that is electrically connected to the fuel cell is smaller than the generated power of the fuel cell.

Further, in the present invention, the power generation stabilizing means may be constituted by a storage device electrically connected to the fuel cell; and power controlling means for compensating for a power deficiency caused by stabilization of the output of the fuel cell through discharge from the storage device. When power generation in the fuel cell is stabilized, a fixed amount of power is output, but when the required load power is larger than the output power, a power deficiency is generated. According to the constitution described above, the power deficiency is supplied by the storage device, and therefore it is possible to respond to a situation in which an increase in the required load power occurs during AC impedance measurement. Note that a power deficiency occurs when the consumed power (load power) of the load device (for example, a drive motor or the like) that is electrically connected to the fuel cell is larger than the generated power of the fuel cell.

Also in the present invention, the impedance measuring means may be constituted to stop measuring the AC impedance when the power deficiency exceeds the supplementary power provided through discharge from the storage device.

When the stabilized power generation amount of the fuel cell is deficient such that the deficiency is compensated for by discharge from the storage device, and the required load power increases suddenly due to a sudden operation of an accelerator pedal or the like, it may be impossible to achieve the required load power through discharge from the storage device. According to the constitution described above, AC impedance measurement is stopped temporarily when the required load exceeds the power that can be discharged from the storage device, and thus it is possible to respond to sudden load variation.

Also in the present invention, the impedance measuring means preferably stop measuring the AC impedance when the power that can be charged to/discharged from the storage device is limited. Charging/discharging can be performed with respect to the storage device in accordance with its capacity, but depending on the storage device and the temperature of related devices, the current that can flow through the power system may sometimes be limited. According to the constitution described above, impedance measurement is stopped when a predetermined limit is applied to the power of the storage device, and as a result, the safety and durability of the system is improved.

The present invention may also be constituted such that when the fuel cell is in a low output operating mode, the AC impedance is measured after increasing the power generation amount of the fuel cell by a predetermined amount. AC impedance measurement references a phase lag of the current relative to the applied AC voltage, and hence the measurement precision is low unless a certain current is supplied. In a low output operating mode such as an idle operating mode, the amount of power generation is small, and hence the power is generation amount is sometimes unsuitable for AC impedance measurement. According to the constitution described above, in a low output operating mode, measurement is begun after the power generation amount has been increased, and therefore impedance measurement can be performed with a high degree of precision.

Note that a "low output operating mode" is an operating mode in which the output of the fuel cell is relatively low with respect to a rated output or a maximum output.

Specifically, the present invention described briefly above is a fuel cell system capable of measuring AC impedance, comprising: a storage device capable of being charged with power from a fuel cell and discharging power to a load device; power generation stabilizing means for stabilizing power generation in the fuel cell; impedance measuring means for measuring AC impedance after power generation in the fuel cell has been stabilized; charging means for charging a power surplus to the storage device when a power surplus occurs as a result of power generation by the stabilized fuel cell; discharging means for discharging power from the storage device to compensate for a power deficiency when a power deficiency occurs as a result of power generation by the stabilized fuel cell; power generation amount increasing means for measuring the AC impedance after increasing the power generation amount of the fuel cell by a predetermined amount when the fuel cell is in a low output operating mode; first measurement stopping means for stopping AC impedance measurement when the power deficiency exceeds the dischargeable power of the storage device; and second measurement stopping means for stopping AC impedance measurement when the power that can be charged to/discharged from the fuel cell is limited.

DETAILED DESCRIPTION

Next, preferred embodiments of the present invention will be described with reference to the drawings.

In the embodiments of the present invention, the present invention is applied to a hybrid fuel cell system installed in an electric automobile. The embodiments to be described below are merely examples of the manner in which the present invention may be applied, and do not limit the present invention.

First Embodiment

A first embodiment relates to a fuel cell system in which AC impedance in a low frequency range is measured after power generation in a fuel cell is stabilized, and more particularly to an example in which a power surplus or a power deficiency accompanying power generation stabilization of the fuel cell can be charged to/discharged from a storage device.

Figure 2:
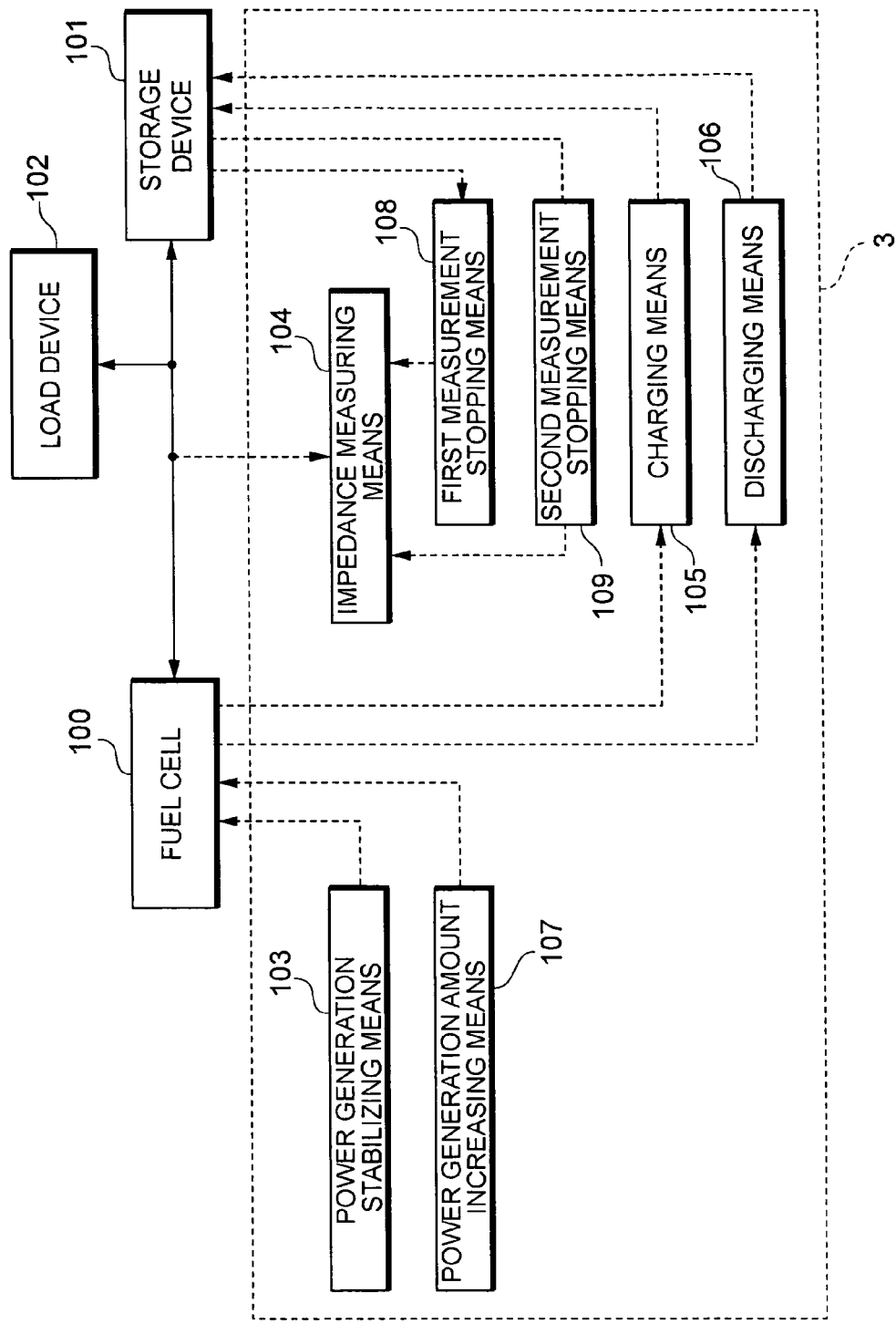
FIG. 2 is a function block diagram of the present invention.

FIG. 2 is a function block diagram relating to the AC impedance measurement of the present invention, which is realized by this hybrid fuel cell system.

As shown in FIG. 2, the hybrid fuel cell system comprises a fuel cell 100, and a storage device 101 to which power can be charged from the fuel cell 100 and from which power can be discharged to a load device 102. Power may be supplied to the load device 102 from one or both of the fuel cell 100 and the storage device 101, and regenerated power produced by the load device 102 may be charged to the storage device 101. The AC impedance measurement function of this fuel cell system is provided by a control unit 3.

The control unit 3 comprises the following function blocks:

(1) power generation stabilizing means 103 for stabilizing power generation in the fuel cell 100;
(2) impedance measuring means 104 for measuring the AC impedance after power generation in the fuel cell 100 has been stabilized;
(3) charging means 105 for charging a power surplus to the storage device 101 when a power surplus is generated during power generation by the stabilized fuel cell 100;
(4) discharging means 106 for compensating for a power deficiency by discharging power from the storage device 101 when a power deficiency is generated during power generation by the stabilized fuel cell 100;
(5) first measurement stopping means 108 for stopping AC impedance measurement when the power deficiency exceeds the power that can be discharged from the storage device 101;
(6) second measurement stopping means 109 for stopping AC impedance measurement when the power that can be charged to/discharged from the fuel cell 100 is limited; and
(7) power generation amount increasing means 107 for measuring the AC impedance after increasing the power generation amount of the fuel cell 100 by a predetermined amount when the fuel cell 100 is in a low output operating mode.

The power generation amount increasing means serving as constitutional element (7) will be described in a second embodiment. In the first embodiment, processing realized by the remaining function blocks will be described.

Figure 1:
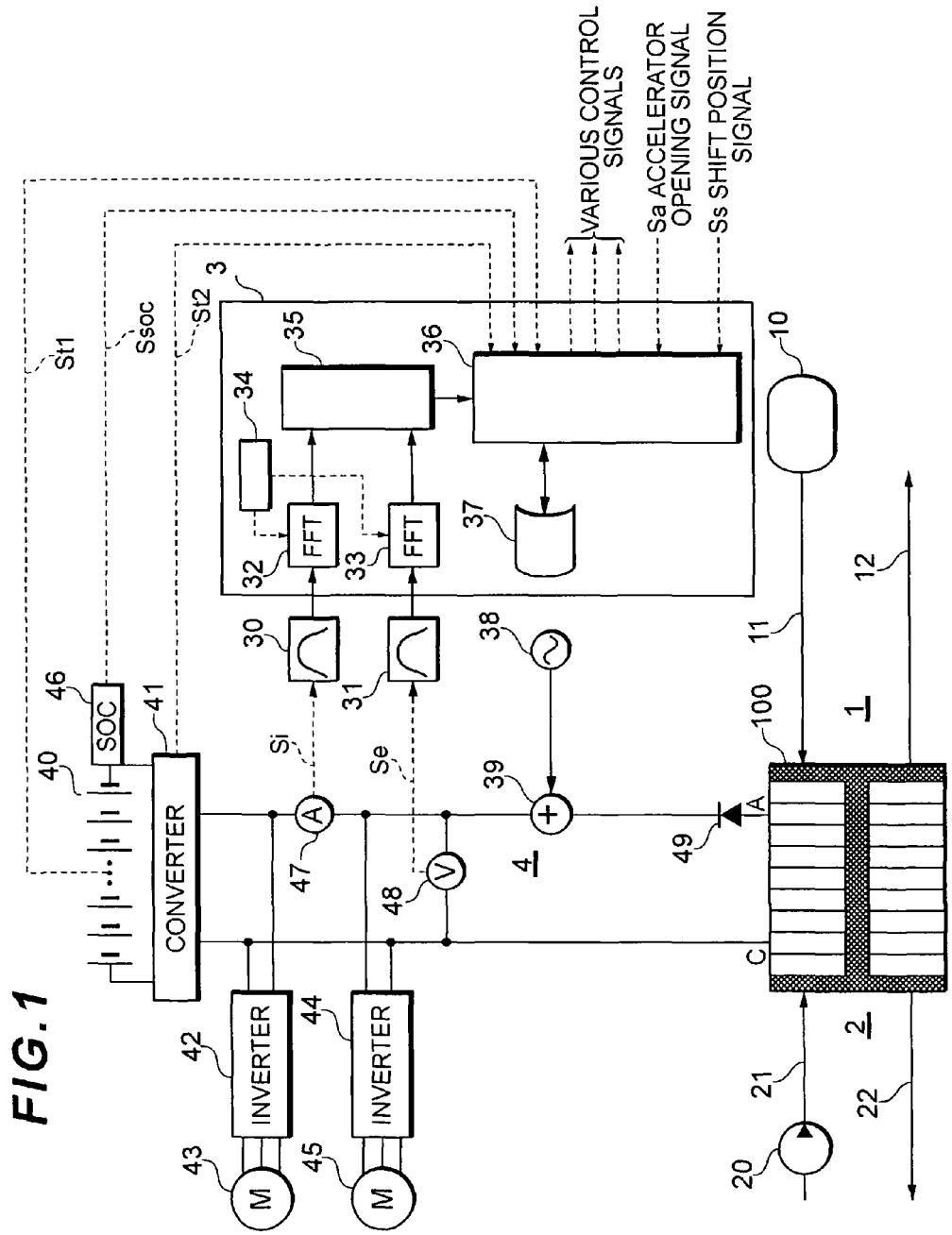
FIG. 1 is a block diagram of a hybrid fuel cell system according to an embodiment.

FIG. 1 is a block diagram showing the hybrid fuel cell system in detail.

As shown in FIG. 1, the hybrid fuel cell system is constituted by an anode gas supply system 1 for supplying hydrogen gas serving as an anode gas to the fuel cell 100, a cathode gas supply system 2 for supplying air serving as a cathode gas to the fuel cell 100, the control unit 3, which executes an AC impedance measuring method according to the present invention, and a power system 4 serving as an AC impedance measurement subject.

The fuel cell 100 has a stack structure formed by a plurality of stacked cells (single cells). Each cell has a structure in which a power generation body known as an MEA (Membrane Electrode Assembly) is sandwiched between a pair of separators having hydrogen gas, air, and cooling water passages. The MEA has a structure in which a polymer electrolyte is sandwiched between two electrodes, namely an anode and a cathode. The anode is formed by providing a fuel electrode catalyst layer on a porous support layer, and the cathode is formed by providing an air electrode catalyst layer on a porous support layer. Alternatively, a phosphate fuel cell, a molten carbonate fuel cell, or another type of fuel cell may be used.

The fuel cell 100 causes a reverse water electrolysis reaction. Hydrogen gas serving as an anode gas is supplied to the anode (negative pole) side from the fuel gas supply system 1, and air serving as a cathode gas containing oxygen is supplied to the cathode (positive pole) side from the cathode gas supply system 2. A reaction such as that shown in Equation (1) is produced on the anode side, and a reaction such as that shown in Equation (2) is produced on the cathode side. As a result, electron circulation occurs, causing a current to flow.

$$H_2 \rightarrow 2H^+ + 2e^- \quad (1)$$

$$2H^+ + 2e^- + (½)O_2 \rightarrow H_2O \quad (2)$$

The anode gas supply system 1 comprises a hydrogen tank 10 serving as a supply source of the hydrogen gas that serves as the fuel gas, an anode gas supply passage 11, and an anode off-gas discharge passage 12. Although not shown in the drawing, the anode gas supply system 1 may also be provided with a hydrogen pump for causing the hydrogen gas to flow, and a base valve, regulating valve, shutoff valve, check valve, gas-liquid separator, and so on, which are required to manage and control the hydrogen gas.

The hydrogen tank 10 is filled with high-pressure hydrogen gas. Instead of a high-pressure hydrogen tank, a hydrogen tank using a hydrogen absorbing alloy, a hydrogen supply mechanism using reformed gas, a liquid hydrogen tank, a liquefied fuel tank, and so on may be applied as the hydrogen supply source. The anode gas supply passage 11 is a pipe for supplying the high-pressure hydrogen gas, and a pressure regulating valve (regulator) or the like, not shown in the drawing, may be provided at a midway point thereon. Hydrogen gas supplied through the anode gas supply passage 11 is supplied to the anode side of each single cell in the fuel cell 100 through a manifold, and after producing an electrochemical reaction in the anode of the MEA, the hydrogen gas is discharged as anode off-gas (hydrogen off-gas). The anode off-gas discharge passage 12 is a passage for discharging the anode off-gas discharged from the fuel cell 100, and may form a recirculation passage. The recirculation passage is formed to return the anode off-gas to the anode gas supply passage 11 via a check valve and an ejector, not shown in the drawing.

The cathode gas supply system 2 comprises a compressor 20, a cathode gas supply passage 21, and a cathode off-gas discharge passage 22. Although not shown in the drawing, the cathode gas supply system 2 may also be provided with a humidifier for controlling the humidity of the air serving as the cathode gas, i.e. oxidizing gas, a gas-liquid separator for removing cathode off-gas (air off-gas), a diluter for mixing the anode off-gas with the cathode off-gas, a silencer, and so on.

The compressor 20 compresses air taken in from an air cleaner or the like, modifies the air amount and air pressure, and supplies the air to the cathode side of the fuel cell 100. Air supplied through the cathode gas supply passage 21 is supplied to the cathode side of each single cell in the fuel cell 100 through a manifold, similarly to the hydrogen gas, and after producing an electrochemical reaction in the cathode of the MEA, the air is discharged as cathode off-gas. The cathode off-gas discharged from the fuel cell 100 is mixed with the anode off-gas through dilution, and then discharged.

The power system 4 comprises a battery 40, a DC-DC converter 41, a traction inverter 42, a traction motor 43, an auxiliary inverter 44, a high-pressure auxiliary device 45, a battery computer 46, a current sensor 47, a voltage sensor 48, a backflow-preventing diode 49, and so on.

The battery 40 relates to the storage device 101 of the present invention, and is constituted by a chargeable/dischargeable secondary battery. Various types of secondary battery, such as a nickel-hydrogen battery, may be used as the battery. Instead of a secondary battery, a chargeable/dischargeable storage device such as a capacitor may be used. The battery 40 is capable of outputting a high voltage by stacking and connecting in series a plurality of battery units that generate power at a fixed voltage.

The battery computer 46 is provided on an output terminal of the battery 40, and is capable of communicating with the control unit 3. The battery computer 46 monitors the state of charge of the battery 40 to keep the battery within an appropriate charging range and prevent overcharging and over-discharging, and notifies the control unit 3 when overcharging, over-discharging or the like occurs.

The DC-DC converter 41 causes power to flow by increasing/decreasing a voltage between a primary side and a secondary side. For example, the DC-DC converter 41 increases the output voltage of the battery 40 on the primary side to the output voltage of the fuel cell 100 on the secondary side to supply power to the load device 102, such as the traction motor 43 or the high-pressure auxiliary device 45. Conversely, the DC-DC converter 41 reduces the voltage of a power surplus of the fuel cell 100 or regenerated energy from the load device 102 on the secondary side and charges the battery 40 on the primary side therewith.

The traction inverter 42 converts a direct current into a three-phase current, and supplies the three-phase current to the traction motor 43. The traction motor 43 is a three-phase motor, for example, and serves as the main power source of the automobile in which the fuel cell system is installed.

The auxiliary inverter 44 serves as DC-AC converting means for driving the high-pressure auxiliary device 45. The high-pressure auxiliary device 45 corresponds to various types of motor required to operate the fuel cell system, such as the motors of the compressor 20, hydrogen pump, and cooling system.

The current sensor 47 detects a secondary side current of the DC-DC converter 41, and is capable of supplying this current to the control unit 3 as a detection signal Si. The voltage sensor 48 detects a secondary side voltage, and is capable of supplying the voltage to the control unit 3 as a detection signal Se.

The control unit 3 is constituted by a universal computer comprising a CPU (central processing unit), RAM, ROM, an interface circuit, and so on. The control unit 3 mainly executes software programs stored in the internal ROM and so on in sequence to control the entire fuel cell system, including the anode gas supply system 1, cathode gas supply system 2, and power system 4, and is also capable of executing the AC impedance measuring method of the present invention in the fuel cell system.

More specifically, the control unit 3 is divided into the following operation blocks. The blocks that relate particularly to the present invention are filters 30, 31, FFT processing units 32, 33, a correction processing unit 34, an impedance analysis unit 35, a determination unit 36, a storage device 37, an AC signal generator 38, and an AC signal adder 39.

The AC signal generator 38 is an oscillator for generating an AC signal that is superposed on power wiring, and is preferably constituted to be capable of generating AC signals at both high and low frequencies. In the fuel cell, the frequency characteristic of the AC impedance varies according to the internal condition, such as the wetness, of the electrolyte, and therefore, by measuring the AC impedance at no less than two different frequencies, it is possible to detect whether the electrolyte is overhydrated or dry. By employing a frequency of approximately 300 Hz as a high frequency AC signal and a frequency of no more than 10 Hz as a low frequency AC signal, for example, the internal condition of the fuel cell can be inferred by analogy. The adder 39 is constituted by a power transistor or the like, for example, and serves to superpose (modulate) an AC signal applied to a base from the AC signal generator 38 onto power wiring. Alternatively, the output of the AC signal generator 38 may be superposed onto a command voltage of the DC-DC converter 41.

Note that the present invention is used to prevent a situation in which the AC impedance cannot be measured accurately due to current variation caused by operations of the high-pressure auxiliary device and so on.

The filters 30 and 31 are band-pass filters that pass only AC signals corresponding to the transmitting frequency of the AC signal generator 38. The filter 30 passes only the frequency component relating to AC impedance measurement of the detection signal Si detected by the current sensor 47. The filter 31 passes only the frequency component relating to AC impedance measurement of the detection signal Se detected by the voltage sensor 48.

The FFT processing units 32 and 33 perform a fast Fourier transform calculation on the current detection signal Si and the voltage detection signal Se, and divide the current detection signal Si and voltage detection signal Se in the measurement frequency components into a real part and an imaginary part, respectively ($a_i+jb_i$, $a_e+jb_e$). The impedance analysis unit 35 calculates AC impedance X ($a_x+jb_x$) on the basis of the voltage detection signal and current detection signal subjected to FFT processing, determines the distance from an origin on a complex plane (effective value) $r$ ($=\sqrt{a_x^2+jb_x^2}$) and a phase angle $\theta$ ($=\tan^{-1}(b/a)$), and determines the AC impedance in the AC signal of the applied frequency.

Here, the correction processing unit 34 corrects phase lag and gain variation occurring in accordance with the filter characteristics of the filters 30 and 31. The correction processing unit 34 corrects coefficients ($a_i$, $b_i$, $a_e$, $b_e$) of the real part and imaginary part in the FFT processing units 32 and 33 on the basis of the pre-measured phase lag and gain variation of the filters 30 and 31. As a result of this correction processing, the actual voltage detection signal and current detection signal, excluding phase lag and gain variation occurring in accordance with the filter characteristics, are obtained.

The determination unit 36 stores the effective value and phase angle determined by the impedance analysis unit 35 or a real part and an imaginary part ($a_{Xf1}$, $b_{Xf1}$) ($a_{Xf2}$, $b_{Xf2}$) on a complex plane at two different frequencies f1 and f2 in the storage device 37. To determine the resistance overvoltage and diffusion overvoltage of a fuel cell, an impedance curve on a complex plane is determined by a geometrical calculation based on two points on the complex plane, whereupon the resistance value at an infinite frequency is set as the resistance of the electrolyte and the resistance value at zero frequency is set as the resistance conversion value of the activation overvoltage and the diffusion overvoltage.

By determining and storing the AC impedance while varying the transmitting frequency of the AC signal generator 38, the impedance curve can be determined without the need for special geometrical calculations.

The determination unit 36 is constituted on the basis of the present invention to control the operating condition of the fuel cell system on the premise of AC impedance measurement. This will be described in detail below.

Figure 3:
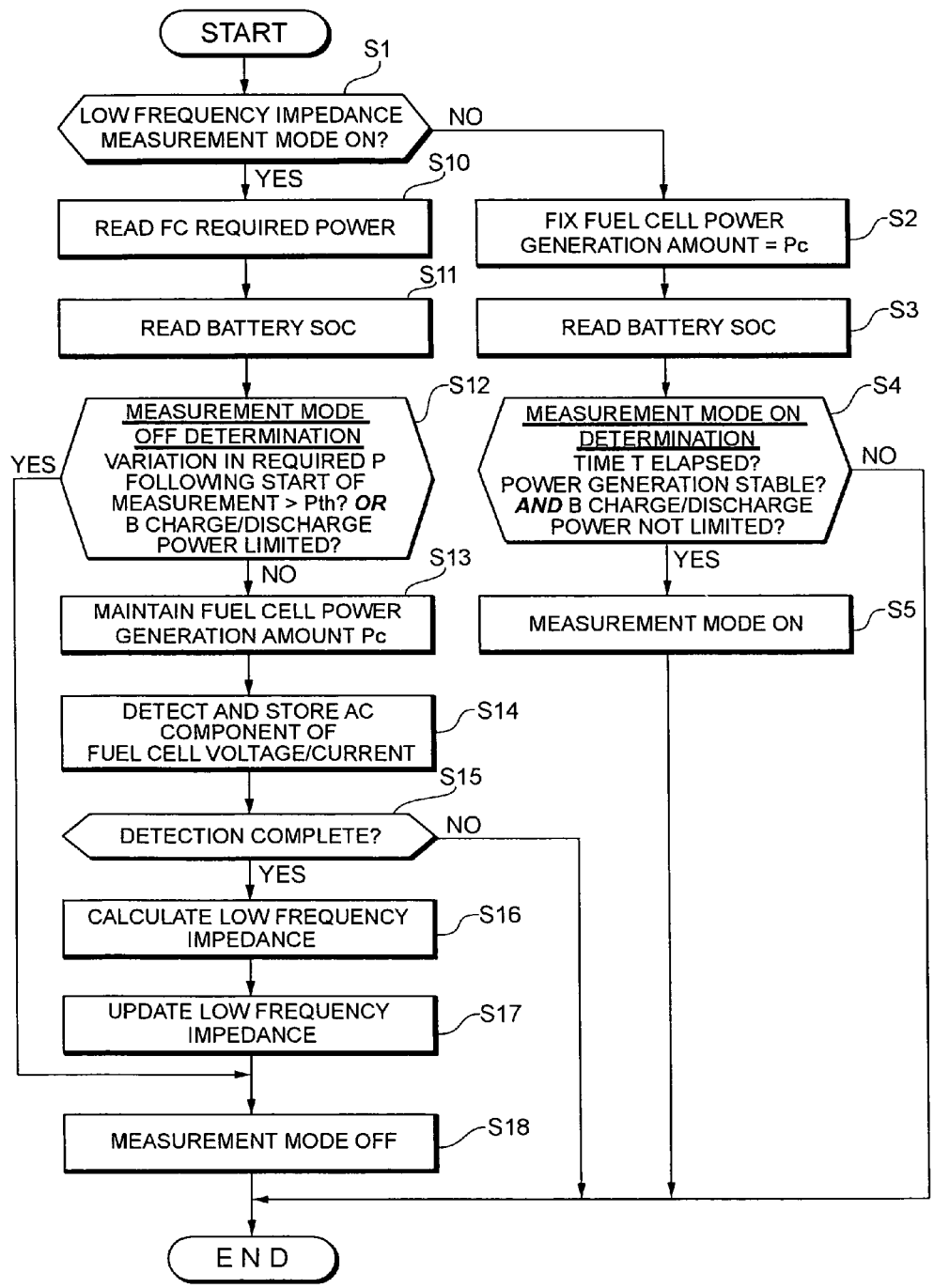
FIG. 3 is a flowchart illustrating an AC impedance measuring method according to a first embodiment.

An AC impedance measuring method according to the first embodiment, which is implemented by the determination unit 36, will now be described with reference to the flowchart in FIG. 3. A particular feature of this AC impedance measuring method is that AC impedance in a low frequency range is measured after power generation in the fuel cell 100 is stabilized.

First, a determination is made as to whether or not a mode for implementing low frequency AC impedance measurement has been set (S1). Low frequency AC impedance measurement is AC impedance measurement in a frequency band that is affected by the operating condition of the fuel cell, for example a frequency band of 10 Hz or less.

When the low frequency AC impedance measurement mode has not been set (S1: NO), a determination is made as to whether or not to switch to the AC impedance measurement mode. First, power generation in the fuel cell 100 is stabilized as a first feature of the present invention. More specifically, the torque of the traction motor 43 and high-pressure auxiliary device 45 in the fuel cell 100 is fixed to stabilize the load condition, and the flow rate of the hydrogen gas and air supplied to the fuel cell 100 is fixed. In so doing, the operating condition of the fuel cell is stabilized, and as a result, the current generated by the fuel cell 100 is fixed (S2). The fixed generated power at this time is set at a fixed value Pc.

Next, a detection signal $S_{SOC}$ indicating the state of charge of the battery 40 is read from the battery computer 46 (S3). By referencing the detection signal $S_{SOC}$, it is possible to detect whether the battery 40 is within an appropriate charging region, an over-discharge region, or an overcharge region. A detection signal $S_{t1}$, indicating the internal temperature of the battery 40 and a detection signal $S_{t2}$ indicating the internal temperature of the converter 41 are also referenced. When the internal temperature of the battery 40 or the converter 41 is too high, it is inappropriate, from the viewpoint of element protection and so on, to cause any more current to flow, and therefore, by referencing the temperature, the current limit of the system can be learned.

Next, a determination is made as to whether or not to switch the AC impedance measurement mode ON (S4).

First, a determination is made as to whether or not a fixed time period T has elapsed from the previous AC impedance measurement. The AC impedance is used to check the condition of the fuel cell system, and therefore an appropriate interval T during which variation may occur in the system condition should be provided.

Next, a determination is made as to whether or not power generation in the fuel cell 100 is stable. Stable power generation indicates a state in which the fuel gas (hydrogen gas, air) supply to the fuel cell 100 is maintained at a fixed level or halted, and power is supplied to the traction motor 43 and high-pressure auxiliary device 45 mainly from the battery 40, for example. This determination is made to prevent a situation in which the generated current of the fuel cell 100 varies due to load variation or an operation of the high-pressure auxiliary device 45, leading to variation in the amplitude (gain) of the current detection signal that serves as the basis for AC impedance measurement.

Note that the determination as to whether or not the output power of the fuel cell 100 is stable may be made by referencing the detection signals from the current sensor 47 and voltage sensor 48 instead of maintaining the load condition of the fuel cell at a fixed level and fixing the fuel gas supply amount, as described above. If the current value detected by the current sensor 47 and the voltage value detected by the voltage sensor 48 both remain within a predetermined variation range for at least a fixed time period, power generation by the fuel cell may be considered stable.

Further, a confirmation is made that a current limit has not occurred in the system, starting with the battery. For example, determinations are made as to whether or not the battery 40 is in an over-discharged or overcharged condition and whether or not the internal temperature of the battery 40 or converter 41 is too high. The reason for these determinations is that when a current limit occurs, it is inappropriate to increase the power supply from the battery 40, and therefore the driving power of the traction motor 43 and high-pressure auxiliary device 45 must be covered by power generation in the fuel cell 100.

When these conditions are all satisfied (S4: YES), the AC impedance measurement mode is switched ON (S5). If any one of the conditions is not satisfied (S4: NO), the processing is terminated without switching the AC impedance measurement mode ON.

On the other hand, when the AC impedance measurement mode has already been switched ON (S1: YES), a determination is made as to whether or not the impedance measurement mode can be maintained.

First, the power required by the fuel cell 100 is read (S10). The required power of the fuel cell 100 is determined on the basis of an accelerator opening signal Sa and a shift position signal Ss as the power required by the system to obtain the currently required operating condition. Then, the detection signal $S_{SOC}$ of the battery computer 46 is read (S11).

Next, a determination is made as to whether or not a condition for continuing AC impedance measurement has been satisfied (S12).

First, a determination is made as to whether or not variation in the required power following the start of AC impedance measurement is greater than a predetermined threshold Pth. The threshold Pth is determined according to the amount of power that can be supplied from the battery 40 per unit time. The reason for this determination is that when the variation in the required power of the system equals or exceeds a fixed value, power requirements cannot be satisfied through power supply from the battery 40 alone.

Further, a confirmation is made that a current limit has not occurred in the battery and other system components. For example, determinations are made as to whether or not the battery 40 is in an over-discharged or overcharged condition and whether or not the internal temperature of the battery 40 or converter 41 is too high. The reason for these determinations is that when a current limit occurs, it is inappropriate to increase the power supply from the battery and so on, and therefore the driving power of the traction motor 43 and high-pressure auxiliary device 45 must be covered by power generation in the fuel cell 100. In this case, AC impedance measurement cannot be performed.

When any one of these conditions is established (S12: YES), AC impedance measurement is temporarily inappropriate, and therefore the AC impedance measurement mode is switched OFF (S18), and the processing is terminated.

On the other hand, when none of the conditions in the step S12 is established (S12: NO), this means that the system is being operated by the power supplied from the battery 40 alone, and therefore power generation in the fuel cell 100 is continued using the fixed power value Pc (S13).

When the preparation described above is complete, AC impedance measurement is continued (S14). The voltage detection signal Se and current detection signal Si are detected at each frequency of the AC signal, and the detected voltage detection signal and current detection signal are stored in the storage device 37. This AC impedance measuring method may be constituted such that detection is performed at a new frequency every time the sequence begins, or such that detection is performed at a plurality of frequencies at one time.

When measurement at all of the measurement-related frequencies is not complete (S15: NO), the next measurement is performed, and when measurement at all of the frequencies is complete (S15: YES), the low frequency AC impedance is calculated on the basis of the detected voltage detection signal and current detection signal (S16). In other words, the AC impedance is determined on the basis of the phase difference and gain difference between the voltage component and current component. The determined AC impedance is stored and updated as a parameter indicating the internal condition at this frequency at the current point in time (S17). Once the AC impedance has been updated, the AC impedance measurement mode is switched OFF (S18).

The description based on this flowchart is an example of the present invention, and there are no limitations on the details and sequence of the processing. As long as the fuel cell is stabilized before actual AC impedance measurement begins and AC impedance measurement is stopped when the required power of the system is large or a current limit occurs in the system, the present invention may be modified as desired.

According to the first embodiment described above, processing (S2) to stabilize power generation in the fuel cell is executed prior to AC impedance measurement, and therefore a cause of variation in the generated power of the fuel cell is eliminated during AC impedance measurement. Hence, the AC impedance can be measured with a high degree of precision.

Also according to the first embodiment, a power surplus generated during power generation stabilization of the fuel cell 100 is charged to the battery 40, and therefore energy is used effectively.

Also according to the first embodiment, a power deficiency generated during power generation stabilization of the fuel cell 100 is compensated by discharge from the battery 40, and therefore load variation can be followed without stopping AC impedance measurement when the required load power increases during measurement.

Also according to the first embodiment, when the power Pth provided through discharge from the battery 40 is exceeded, AC impedance measurement is stopped (S12, S18), making it possible to respond to sudden load variation such as a sudden operation of the accelerator pedal.

Also according to the first embodiment, when the power that can be charged to/discharged from the battery 40 and so on is limited, AC impedance measurement is stopped (S12, S18), and as a result, the safety and durability of the system can be improved.

Second Embodiment

A second embodiment of the present invention relates to an AC impedance measuring method in a low output operating mode such as an idling operation.

The system block diagram of FIG. 1 and the function block diagram of FIG. 2 are applied as is to the hybrid fuel cell system of the second embodiment, and hence description thereof has been omitted.

Figure 4:
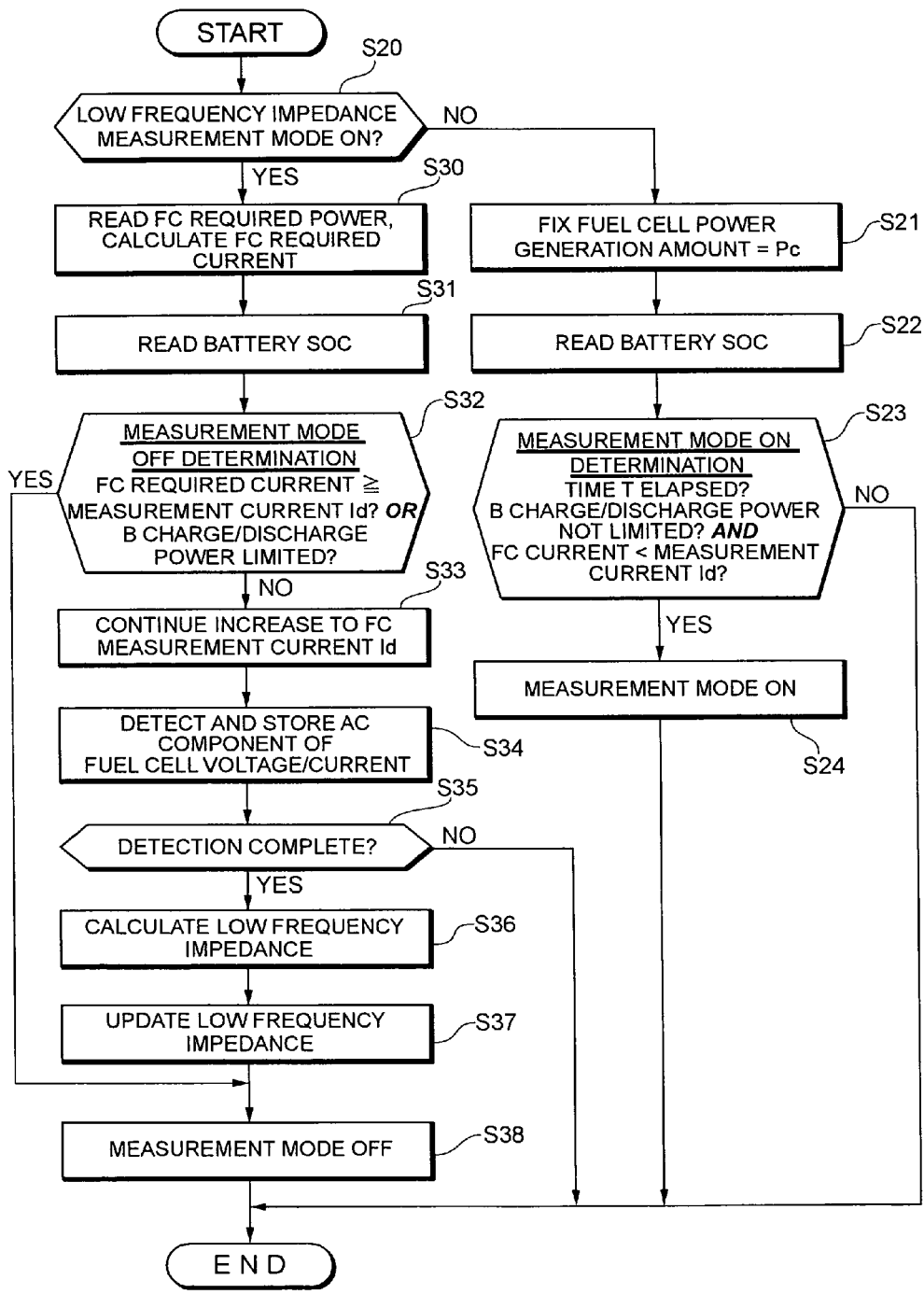
FIG. 4 is a flowchart illustrating an AC impedance measuring method according to a second embodiment.

AC impedance measurement processing according to the second embodiment will now be described on the basis of the flowchart in FIG. 4. During AC impedance measurement according to the second embodiment, when the fuel cell is in a low output operating mode, the AC impedance is measured after the power generation amount of the fuel cell has increased by a predetermined amount. This flowchart relates to specific processing for measuring AC impedance when the fuel cell is in a low output state. The processing will now be described in detail.

First, a determination is made as to whether or not a mode for implementing low output AC impedance measurement has been set (S20). When the low output AC impedance measurement mode has not been set (S20: NO), power generation of the fuel cell 100 is stabilized on the premise of a determination as to whether or not to switch to the AC impedance measurement mode (S21). More specifically, the torque of the traction motor 43 and high-pressure auxiliary device 45 in the fuel cell 100 is fixed to stabilize the load condition, and the flow rate of the hydrogen gas and air supplied to the fuel cell 100 is fixed. In so doing, the operating condition of the fuel cell is stabilized, and as a result, the current generated by the fuel cell 100 is fixed such that the generated power is set at the fixed value Pc.

Next, the detection signal $S_{SOC}$ indicating the state of charge of the battery 40 is read from the battery computer 46 (S22) to detect whether the battery 40 is within an appropriate charging region, an over-discharge region, or an overcharge region. The detection signal $S_{t1}$, indicating the internal temperature of the battery 40 and the detection signal $S_{t2}$ indicating the internal temperature of the converter 41 are also referenced.

Next, a determination is made as to whether or not to switch the AC impedance measurement mode ON (S23).

First, a determination is made as to whether or not the fixed time period T has elapsed from the previous AC impedance measurement. Next, a determination is made as to whether or not power generation in the fuel cell 100 is stable. Further, a confirmation is made that a current limit has not occurred in the system, starting with the battery. These determinations are identical to the first embodiment.

Furthermore, in this embodiment a determination is made as to whether or not the output current of the fuel cell is smaller than a measurement current value Id required for AC impedance measurement (S25). The AC impedance is measured by measuring the voltage and current of the applied AC signal, and calculating the AC impedance from the phase and amplitude level of the delay (lead) of the current relative to the voltage. Hence, if the detected current is not of a certain magnitude, AC impedance measurement is affected by errors and noise, making it impossible to measure the AC impedance accurately. Here, a determination is made as to whether or not the fuel cell 100 is in such a low output state (in other words, a normal operating state in which AC impedance measurement is not underway).

When all of these conditions are satisfied (S23: YES), the low output AC impedance measurement mode is switched ON (S24). When any one of the conditions is not satisfied (S23: NO), the processing is terminated without switching the AC impedance measurement mode ON.

When the low output AC impedance measurement mode is already ON (S20: YES), a determination is made as to whether or not it is possible to maintain the impedance measurement mode.

First, the power required by the fuel cell 100 is read (S30). The required power of the fuel cell 100 is determined on the basis of the accelerator opening signal Sa and the shift position signal Ss as the power required by the system to obtain the currently required operating condition. Then, the detection signal $S_{SOC}$ of the battery computer 46 is read (S31).

Next, a determination is made as to whether or not a condition for continuing AC impedance measurement has been satisfied (S32).

First, a determination is made as to whether or not the required current calculated from the required power of the fuel cell 100 is greater than the AC impedance measurement current Id. When the current amount calculated from the required power of the system is larger than the measurement current value Id, power requirements cannot be satisfied through power supply from the battery 40 alone. The determination may be made according to the power value, similarly to the first embodiment, rather than by comparing current values.

Further, similarly to the first embodiment, a confirmation is made that a current limit has not occurred in the battery and other system components. For example, determinations are made as to whether or not the battery 40 is in an over-discharged or overcharged condition and whether or not the internal temperature of the battery 40 or converter 41 is too high. The reason for these determinations is that when a current limit occurs, it is inappropriate to increase the power supply from the battery and so on, and therefore the driving power of the traction motor 43 and high-pressure auxiliary device 45 must be covered by power generation in the fuel cell 100. In this case, AC impedance measurement cannot be performed.

When any one of these conditions is established (S32: YES), AC impedance measurement is temporarily inappropriate, and therefore the AC impedance measurement mode is switched OFF (S38), and the processing is terminated.

On the other hand, when none of the conditions in the step S32 is established (S32: NO), the fuel cell output is increased to obtain the measurement current value Id appropriate for AC impedance measurement, and when power is already being generated at the measurement current value Id, this condition is maintained (S33). Thus, power generation in the fuel cell 100 is continued at the stable measurement current value Id.

Next, AC impedance measurement is executed (S34). The voltage detection signal Se and current detection signal Si are detected at each frequency of the AC signal, and the detected voltage detection signal and current detection signal are stored in the storage device 37. This AC impedance measuring method may be constituted such that detection is performed at a new frequency every time the sequence begins, or such that detection is performed at a plurality of frequencies at one time.

When measurement at all of the measurement-related frequencies is not complete (S35: NO), the next measurement is performed, and when measurement at all of the frequencies is complete (S35: YES), the low frequency AC impedance is calculated on the basis of the detected voltage detection signal and current detection signal (S36). In other words, the AC impedance is determined on the basis of the phase difference and gain difference between the voltage component and current component. The determined AC impedance is stored and updated as a parameter indicating the internal condition at this frequency at the current point in time (S37). Once the AC impedance has been updated, the AC impedance measurement mode is switched OFF (S38).

The description based on this flowchart is an example of the present invention, and there are no limitations on the details and sequence of the processing. As long as the fuel cell is stabilized before actual AC impedance measurement begins, AC impedance measurement is stopped when the required power of the system is large or a current limit occurs in the system, and the output current of the fuel cell is increased when small, the present invention may be modified as desired.

According to the second embodiment described above, in addition to similar actions and effects to those exhibited by the first embodiment, measurement is begun after increasing the power generation amount when a low output operating mode has been set, and therefore impedance can be measured with a high degree of precision.

Other Embodiments

The present invention may be subjected to various modifications in addition to the embodiments described above.

For example, in the embodiments described above, the present invention is applied to AC impedance measurement, but the concept of the present invention may be applied to a case in which a varying physical value is detected according to an operation of a load device such as a high-pressure auxiliary device. In other words, the present invention may be applied by controlling the operating condition of the load device to stabilize the output of the fuel cell before measuring the physical value.

In the embodiments described above, a hybrid fuel cell system installed in a vehicle serving as a moving body is used as an example, but the present invention is not limited to a fuel cell system installed in an automobile, and may be applied to a hybrid fuel cell system installed in another moving body such as a ship or an aircraft. Needless to say, the present invention may also be applied to a stationary hybrid fuel cell system.

According to the present invention, AC impedance is measured after power generation in a fuel cell is set in a stable condition. Therefore, no external disturbance occurs during measurement, and the AC impedance can be measured with a high degree of precision.

We claim:

1. A fuel cell system capable of measuring AC impedance in a fuel cell, comprising:
a power generation stabilizing device, wherein said power generation stabilizing device comprises:
a storage device electrically connected to said fuel cell; and
a power controlling device programmed to control power transfer between said fuel cell and said storage device such that an output of said fuel cell is stabilized; and
an impedance measuring device programmed to measure said AC impedance when said output of said fuel cell is stabilized;
wherein said power generation stabilizing device is further programmed to maintain a power generation current of said fuel cell at a constant level.

2. The fuel cell system according to claim 1, wherein said power controlling stabilizing device is further programmed to compensate for a power deficiency caused by stabilization of the output of said fuel cell through discharge from said storage device.

3. The fuel cell system according to claim 2, wherein said impedance measuring device is further programmed to stop measuring said AC impedance when said power deficiency exceeds a supplementary power provided through discharge from said storage device.

4. The fuel cell system according to claim 1, wherein said impedance measuring device is further programmed to stop measuring said AC impedance when a power that can be charged to/discharged from said storage device is limited.

5. The fuel cell system according to claim 1, wherein, when said fuel cell is in a low output operating mode, said AC impedance is measured after increasing a power generation amount of said fuel cell by a predetermined amount.

6. A fuel cell system comprising:
a fuel cell;
a power generation stabilizing device, wherein said power generation stabilizing device comprises a storage device electrically connected to said fuel cell;
a power detection device that detects an output power of said fuel cell;
an AC impedance measuring device that measures AC impedance on the basis of said output power of said fuel cell;
a fuel gas supply device that supplies a fuel cell to said fuel cell;
an oxidizing gas supply device that supplies an oxidizing gas to said fuel cell;
a load device that consumes power from said fuel cell or a storage device;
a control device programmed to control the supply of said fuel gas and said oxidizing gas to said fuel cell and the operations of said load device,
wherein said control device is further programmed to keep the supply of said fuel gas by said fuel gas supply device, the supply of said oxidizing gas by said oxidizing gas supply device, and the operations of said load device, in a stable condition,
to detect the output power of said fuel cell using said power detection device, and
to measure said AC impedance using said AC impedance measuring device when said detected output power is stable; and
a power control device programmed to control power transfer between said fuel cell and said storage device,
wherein said control device is further programmed to control power transferred to/from said storage device, and when said output power of said fuel cell is stable, said control device
(a) is further programmed to control said power control device to charge a power surplus to said storage device when said output power of said fuel cell is excessive, and
(b) is further programmed to control said power control device to cause said storage device to compensate for a power deficiency when said output power of said fuel cell is deficient,
wherein said power generation stabilizing device maintains a power generation current of said fuel cell at a constant level.

7. The fuel cell system according to claim 1, wherein said power controlling device is further programmed to compensate for a power deficiency caused by stabilization of the output of said fuel cell through discharge from said storage device.

8. The fuel cell system according to claim 7, wherein said impedance measuring device is further programmed to stop measuring said AC impedance when said power deficiency exceeds a supplementary power provided through discharge from said storage device.

9. The fuel cell system according to claim 2, wherein said impedance measuring device is further programmed to stop measuring said AC impedance when a power that can be charged to/discharged from said storage device is limited.

10. The fuel cell system according to claim 3, wherein said impedance measuring device is further programmed to stop measuring said AC impedance when a power that can be charged to/discharged from said storage device is limited.

11. The fuel cell system according to claim 7, wherein said impedance measuring device is further programmed to stop measuring said AC impedance when a power that can be charged to/discharged from said storage device is limited.

12. The fuel cell system according to claim 8, wherein said impedance measuring device is further programmed to stop measuring said AC impedance when a power that can be charged to/discharged from said storage device is limited.

\* \* \* \* \*